United States Patent
Huston

(10) Patent No.: US 7,518,501 B2
(45) Date of Patent: Apr. 14, 2009

(54) GPS BASED SITUATIONAL AWARENESS AND IDENTIFICATION SYSTEM AND METHOD

(76) Inventor: Charles D. Huston, 3900 Laguna Vista Cove, Austin, TX (US) 78746

( * ) Notice: Subject to any disclaimer, the term of this patent is extended or adjusted under 35 U.S.C. 154(b) by 234 days.

(21) Appl. No.: 11/456,723

(22) Filed: Jul. 11, 2006

(65) Prior Publication Data

US 2007/0018880 A1 Jan. 25, 2007

Related U.S. Application Data

(60) Provisional application No. 60/699,205, filed on Jul. 14, 2005.

(51) Int. Cl.
*G08B 1/08* (2006.01)
(52) U.S. Cl. .............. 340/539.1; 340/825.49; 342/45; 455/456.1
(58) Field of Classification Search ............. 340/539.13
See application file for complete search history.

(56) References Cited

U.S. PATENT DOCUMENTS

| | | | |
|---|---|---|---|
| 5,364,093 A | 11/1994 | Huston et al. | |
| 6,115,177 A | 9/2000 | Vossler | |
| 6,166,679 A * | 12/2000 | Lemelson et al. | 342/45 |
| 6,195,090 B1 | 2/2001 | Riggins, III | |
| 6,317,127 B1 | 11/2001 | Daily et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 7,002,551 B2 | 2/2006 | Azuma et al. | |
| 7,053,780 B1 | 5/2006 | Straub et al. | |
| 7,209,035 B2 * | 4/2007 | Tabankin et al. | 340/539.11 |
| 7,317,705 B2 * | 1/2008 | Hanson | 370/329 |

(Continued)

FOREIGN PATENT DOCUMENTS

EP 1113669 7/2001

(Continued)

OTHER PUBLICATIONS

Barstow et al., "Personalized Interactive Real-Time Sports Reporting Using Java," American Programmer, Jan. 1997, pp. 32-37.

(Continued)

*Primary Examiner*—Jeff Hofsass
*Assistant Examiner*—Ojiako Nwugo
(74) *Attorney, Agent, or Firm*—Charles D. Huston; Daffer McDaniel, LLP

(57) ABSTRACT

A system and method for observing a security event which shares the position of a number of friendly participants with other participants. Preferably, the position of unknown participants or foes is also displayed to friendly participants. The views are selectable by friendly participants on, for example, a handheld device, to include a view from the participant's position, zoom, pan, and tilt views, or views of another friendly or from another location, giving increased situational awareness. Other information can be shared among friendly participants, including status and directions.

21 Claims, 6 Drawing Sheets

U.S. PATENT DOCUMENTS

2005/0259002 A1  11/2005  Erario et al.
2006/0105857 A1  5/2006  Stark

FOREIGN PATENT DOCUMENTS

| EP | 1262213 | 12/2002 |
|---|---|---|
| WO | 01/05476 | 1/2001 |
| WO | 01/36061 | 5/2001 |

OTHER PUBLICATIONS

International Search Report, PCT/US2006/027218, mailed Feb. 12, 2007.

O'Malley et al., "Human Activity Tracking for Wide-Area Surveillance," University of Florida, Department of Electrical and Computer Engineering, May 2002, 7 pages.

* cited by examiner

GPS BASED SITUATIONAL AWARENESS AND IDENTIFICATION SYSTEM AND METHOD

PRIORITY CLAIM

This application claims priority to U.S. Provisional Application No. 60/699,205 filed Jul. 14, 2005 and claims the benefit under 35 U.S.C. § 120 to concurrently-filed application entitled "GPS Based Spectator and Participant Sport System and Method."

BACKGROUND

1. Field of the Invention

This invention relates generally to security systems and, in particular, to an individual system which depicts other people and objects. In a preferred form, the user can change the depiction including viewing potential foes from a number of angles, locations, and magnitudes.

2. Description of Related Art

GPS systems have been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS Systems have been used in a threat environment by the military in a variety of applications such as navigation aids and guidance systems for ordnance. GPS Systems have also been used for training scenarios. In both the military and civilian security applications, GPS Systems have been used for tracking people or objects.

GPS systems are becoming much more accurate, inexpensive and robust. GPS antennas and engines are fairly inexpensive and accurate with WAAS to less than 2 meters. Accuracy is improving, especially with the increase in the number of advanced satellites and frequencies available. In a local area, the accuracy can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications).

What has not been done in the sports arena is an integrated GPS system for spectators to more fully enjoy a sport. For example, at a NASCAR race, a spectator's location limits his view of the race and is his own unique perspective. While watching a race, the spectator might listen to a radio or watch a portable TV, but the perspective is the announcer's or TV angle. Such divergent perspectives—announcer versus personal—can be confusing. Further, a $3^{rd}$ turn spectator might be most interested in the cars he can see—the ones near the $3^{rd}$ turn. Other sports would benefit from a system that allows a spectator to more fully integrate the contest information with his viewing perspective. In addition to auto racing, football, yachting, horse racing, golf, hockey or any motor sport are candidates for the system and method hereof, especially as size and weight of GPS and radios accompanying a participant decreases.

What is lacking in security applications, including the military, is an integrated GPS system for an individual user to gain situational awareness. That is, while an infantry soldier or security agent might wear a GPS tracking device that transmits his position, this information does the individual little good. Such a security agent might have a radio where some basic information is relayed from a command center, such as the position of other friendly agents.

U.S. Pat. No. 6,744,403 describes a GPS system for tracking objects, such as cars, at a sporting event. See also, U.S. Pat. No. 6,195,090. High data rate packet transmission is known, such as U.S. Pat. Nos. 6,894,994; 6,909,738; 6,885,652; 6,917,644; 6,801,516. Examples of user interfaces, such as PDA's, cell phones, headsets, and the like are U.S. Pat. Nos. 7,053,780; 6,879,443 and 6,115,177. All references cited herein are incorporated by reference.

SUMMARY

The present invention contemplates a GPS system that provides situational information relevant to a user's (friendly) perspective or location or is selectable to view the situation from another location. Preferably, the friendly participants are GPS equipped and communicate their GPS position (and other sensor or status information) with a server at a command center. Unknown participants and foes are detected using other means and their location tracked at the command center. The user has a portable viewing device that accepts the user's position and selectively renders a view of the situation (and/or other information) from the user's perspective or location or selectively from another location. That is, the user can selectively view other friendlies, unknowns, and foes from different locations, views, and magnification. Even remote users can use the portable device with a network information feed.

As an analogy, in a NASCAR race, the cars are all equipped with a GPS engine and a communication link to a central server. Each spectator has a portable device that has a GPS engine, as well as a communication link to the central server. The portable device logs in with the central server, optionally authenticating and telling the server the spectator's location at the track. During the race, the positions of the cars are broadcast to the spectators. In one mode, the portable device displays information most relevant to the spectator's location. For example, the position and vital information of the cars nearest the spectator. In another mode, the portable device has the processing power to take the positions of the cars and the location of the spectator and render a depiction of the cars in real time on the track. The spectator can select the view. For example, the spectator might select "finish line," "overhead," "car 3 driver's view," or "my view."

A spectator at the $3^{rd}$ turn with "my view" selected can see the perspective of the rendering on the portable device to match his own visual observation—i.e. his location including elevation. This adds to a much greater enjoyment of the situation because visual data is added to the display which matches his visual observation. Importantly, the spectator can not only switch views, but can also tilt or pan the perspective or observation point or zoom. That is, from "my view" the spectator might rotate a toggle up incrementally up (or down) from the horizontal view from the spectator's location of the car positions to a vertical view of the situation. Preferably, the toggle would also allow left/right pan functions at any time.

Similarly, in a security situation, the user and each friendly participant has a portable device that has a GPS engine, as well as a communication link to the central server. The portable device logs in with the central server, optionally authenticating and telling the server the user's location. During the engagement, the positions of the user and friendly participants, as well as the estimated positions of the unknowns and foes, are broadcast to the user. In one mode, the portable device displays information most relevant to the user's location. For example, the position and vital information of the friendlies nearest the user can be displayed and the positions and any other information on the unknowns and foes within a certain range of the user can be displayed. In another mode, the portable device has the processing power to take the positions of the friendlies, unknowns, and foes and the location of the user and render a depiction of the participants in real time. The user can select the view. For example, the user might select "bridge view," "overhead," "friendly #3 view," or "my view."

In addition to the view of the unknown or foes (or friendlies) the user can selectively view appended important information. For example, in one mode the user might select no information, in a second mode, the user might select unknown and foe identification only, while in another mode, the user might select identification plus movement or unknowns, plus weapons status of one or more selected friendlies. Other information from friendly sensors are possible (or derived from GPS information) such as weapons status, condition, food and water state, etc. Preferably, the user could go from a view mode to other modes, such as a display of the current information of the friendlies and/or unknowns in tabular form, a view from a particular location (an image or streaming video), remote sensor video or other sensor data, etc. Preferably, the portable device would include a radio (any type of communication link such as GPRS) to relay audio for monitoring friendly to friendly communications or radio broadcasts. In a preferred form, the portable device can be used to communicate with a central server (e.g., command center) and other devices, for example, text commands.

In "my view," for example, the portable device might display only information to the user for unknowns or foes within a certain range. Alternatively, the user might want to follow a particular friendly, unknown, or foe continuously, e.g. follow foe number 8, with selectable views (overheard, zoom, head). In any of these modes, the user could zoom, pan or tilt as described above, freeze, slow motion, replay, etc.

While the preferred embodiment is described in the context of an infantry situation such as that shown in FIGS. 8-10, it is easily seen how the system and method of the present invention is applicable to a wide variety of security situations, such as point defense and border patrol. For example, a logistics function (in the field or at base) might use the portable device while accompanying the friendlies in the field. Information on the position of unknowns or foes can be supplied from a variety of sources—such as optical or infrared triangulation from a number of users to acquire the position data. Once the position information of each participant (unknown, foe, friendly) is gathered or approximated, the information is distributed to the user based on the user's desires. As may be surmised from the NASCAR analogy above, the user might determine the angle or view of the graphic rendering, the tilt, pan or zoom of the graphic depiction, the format of the presentation, i.e. graphic of the region of action or a tabular summary of all participants or one participant, statistics for another user, etc.

While one limitation to the applicability of the present invention to security situations is the ability to determine the position of all participants, those limitations are becoming less meaningful as technology progresses. For example, with current technology a soldier can be fitted with a GPS device and radio that weighs less than ½ pound and is accurate within 5 meters. Foreseeable technology will enable such a device weighing several ounces (mostly battery weight), accurate with WAAS to less than 2 meters and with post-processing to centimeter accuracy. While the preferred embodiment contemplates obtaining participant location information via GPS, other types of location determination sensors are possible, such as proximity sensors, radar or radio triangulation.

While the portable device of the preferred embodiment is a gaming device with GPS and a radio (GPRS) other types of gaming, PDA, and personal devices may equally be used and adapted to security situations. Further, although the preferred embodiment contemplates broadcasting participant location information to authorized users, the rendering load of the data might be distributed. I.e. some of the graphics pipeline for the rendering could be accomplished at the server before transmission. However, rendering technology is rapidly advancing and becoming increasingly realistic with advances in game technology and as the processing power of the portable device increases and the rendering technology develops, it is anticipated that most of the graphics rendering can be performed at the portable device.

DESCRIPTION OF PREFERRED EMBODIMENTS

Figure 1:
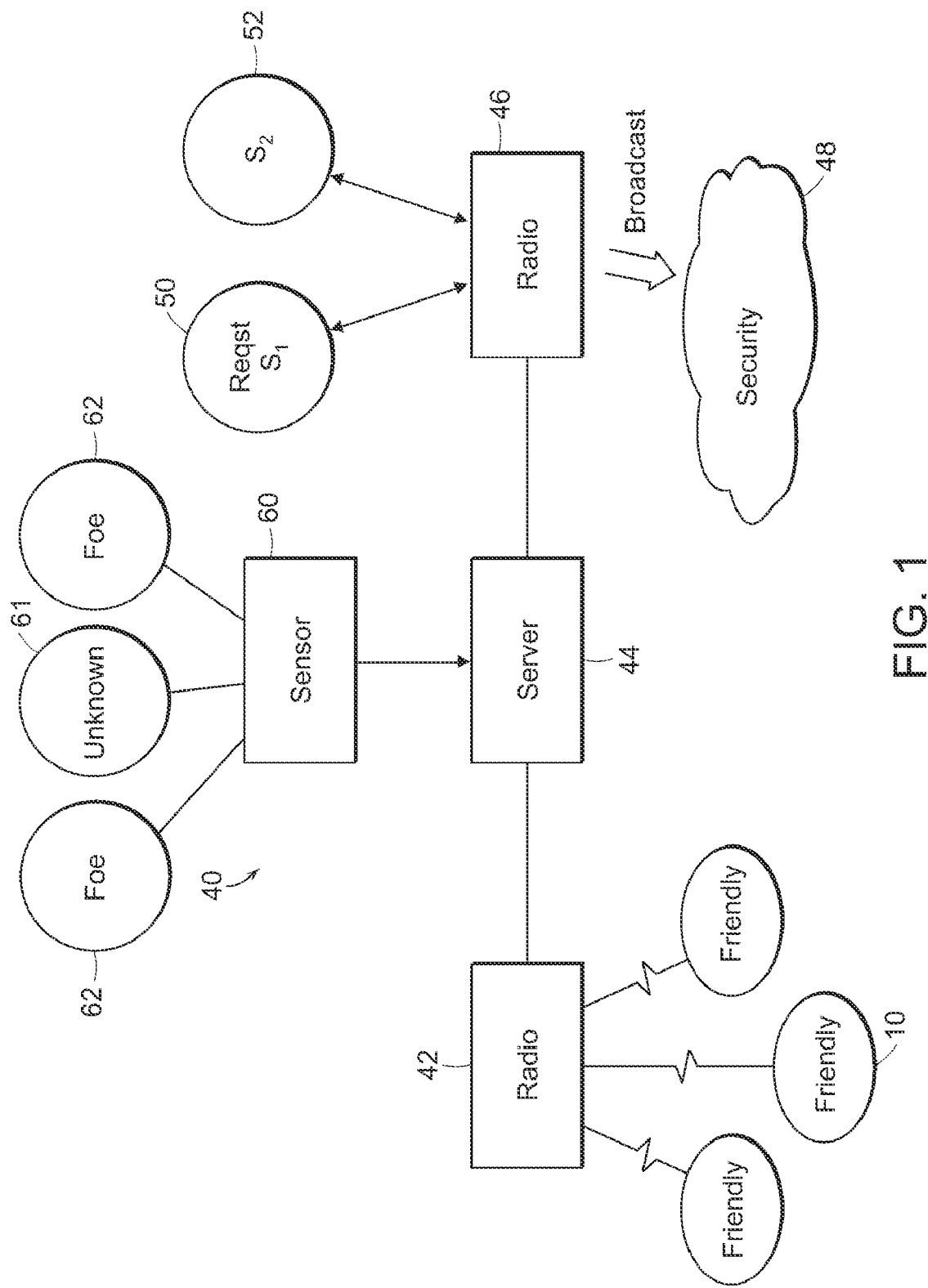
FIG. 1 is a block diagram of the network.

In FIG. 1, a depiction of the network 40 is shown. The friendlies 10 communicate with a radio base station 42 preferably using spread spectrum radio (encrypted or secured if desired). A spread spectrum radio such as made by Freewave Technologies of Boulder, Colo. is a preferred choice (e.g. a 900 MHz board level module). The server 44 stores the position data of each friendly 10 communicated to the base station 42, and other pertinent data such as car sensor data, etc. Ideally, the server 44 can also digitally store the voice communications of interest and images of various scenes of possible interest, i.e., other friendlies. Of course, the server 44 can store command and control messages as well for delivery to friendlies 10. The server 44 can also be used for authentication of portable devices 20 and enable selectable requests from friendlies (i.e. ammunition or food for delivery). In some applications, the participants might broadcast location information directly to other friendlies, i.e. without an intervening server. The radio 46 is used to communicate on a broadcast basis to other security agents 48—here using a GSM tri-band, the GPS position information of the friendlies 10 (encrypted or secured if desired). The devices 20 in the hands of the other security agents 48 processes the position information to render the views illustrated for example in FIGS. 8-10.

In the preferred embodiment friendly agents will carry a device 20 which permits tracking of many, if not all, of the friendly agents. Unknown agents or foes will have to be detected and tracked using a number of different sensors and technologies. For example, ElectroOptical/Infrared (EO/IR) and radar surveillance sensor technologies and systems have been deployed for detection, classification, and tracking of personnel, vehicles, objects and materials such as explosives, drugs, and contraband hidden on persons, and in baggage, vehicles, and shipping containers, using EO/IR and Radar technologies and systems. Such systems include passive and active visible and infrared imagers, passive and active millimeter wave imagers (i.e. holographic radar, real aperture radar, synthetic aperture radar), acoustic imagers and x-ray imagers related technologies (i.e., active radar, ESM bistatic radar, etc.), infrared and low-light systems, and algorithms to process individual and multiple sensor data. The following patents relate to different types of sensors and technologies for detection, classification, and tracking of personnel. U.S. Pat. Nos. 7,046,187; 6,987,560; 6,922,145; 6,856,272; 6,754,368; 6,437,727; and 6,061,014 (herein incorporated by reference). In one mode, the friendlies can mark unknown or foes (signed by EO, optical, or acoustic) which gives an angle to the server 44. From a number of angles the server can compute approximate location by triangulation.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast.

Figure 2:
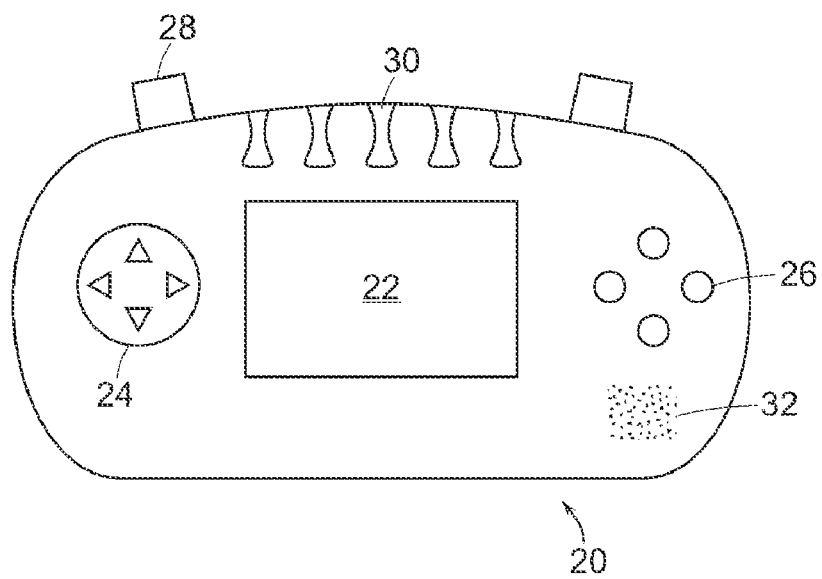
FIG. 2 is a depiction of the portable device of a preferred embodiment.
Figure 3:
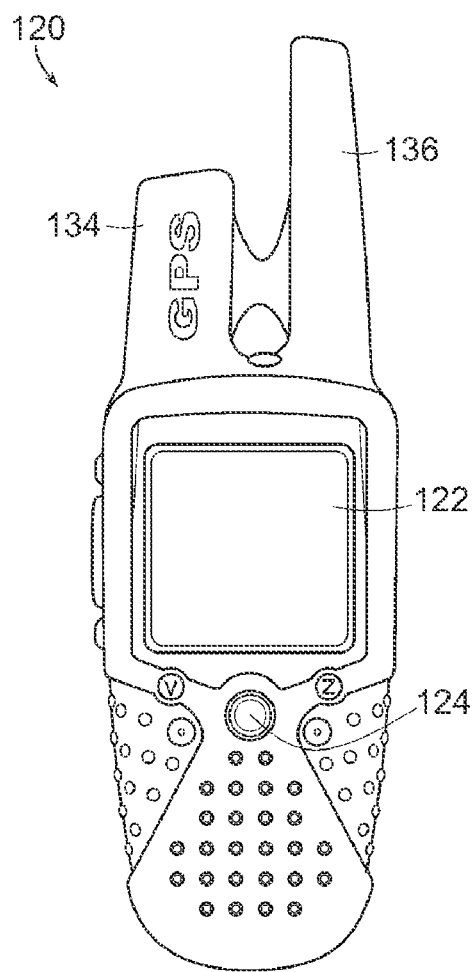
FIG. 3 is a perspective of an alternative embodiment of the portable device, resembling a PDA or a cell phone.

FIG. 2 is a front elevation of the portable device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 2. Not shown are the SD card slot, USB or power ports, or a camera. The Gizmondo was powered by a 400 MHz ARM9 processor and has a 2.8 inch 320×240 pixels TFT screen and an NVIDIA 128 bit GeForce 3D 4500 GPU featuring a programmable pixel shader, hardware transform engine, and 1280 KB of embedded memory.

While the device 20 of FIG. 2 uses an ARM 9 processor and Sirf GPS chipset, substitutions can be readily made (e.g. uBlox GPS chipset). The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 4:
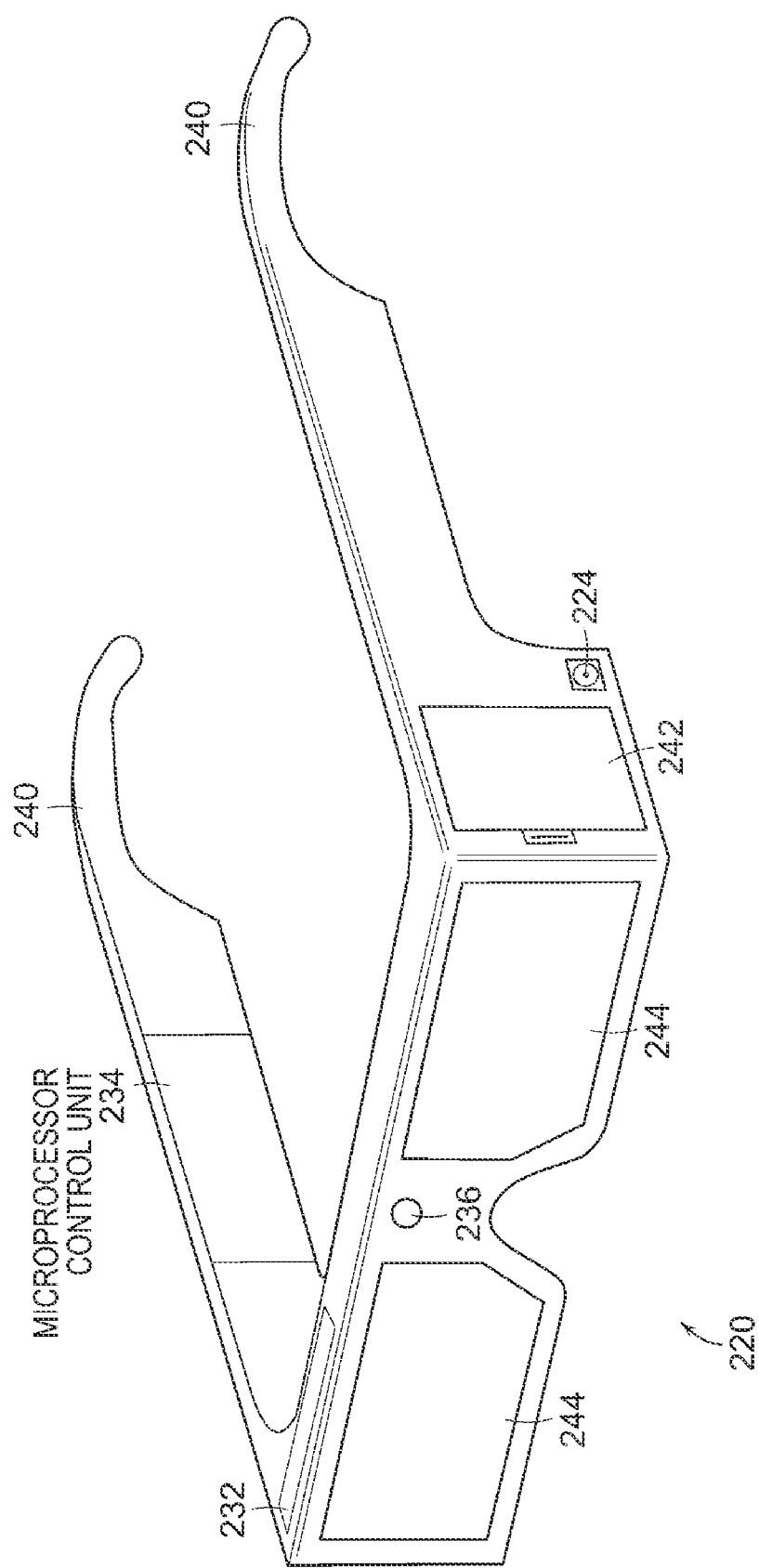
FIG. 4 is a perspective of a portable device where the functionality is built into glasses or goggles worn by the user.
Figure 5:
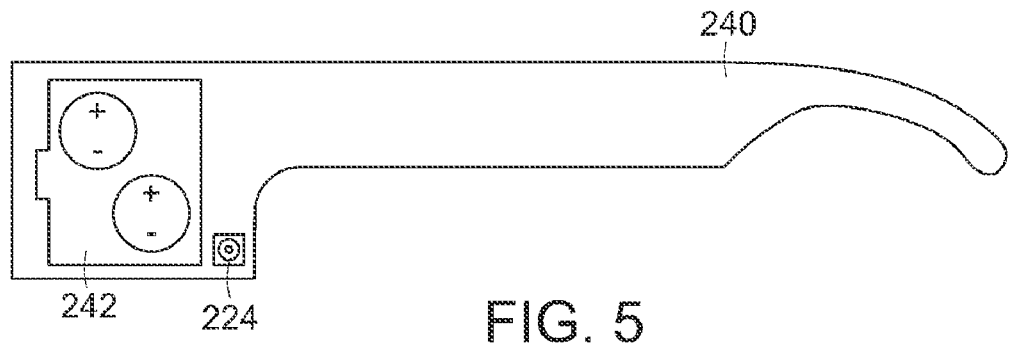
FIG. 5 is a side view of the glasses of FIG. 4.
Figure 6:
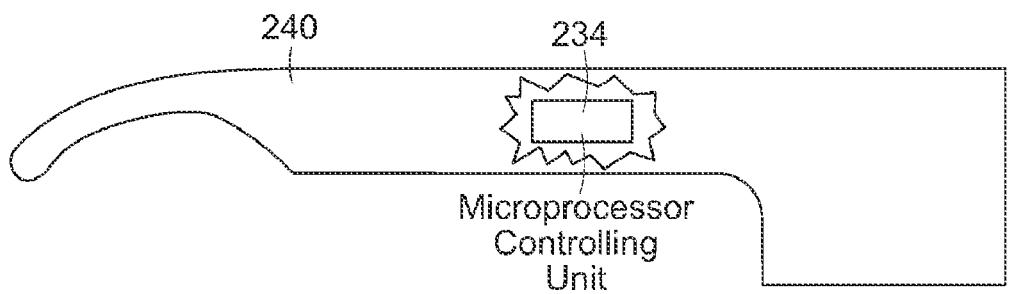
FIG. 6 is a side view of the glasses of FIG. 4 from the other side.
Figure 7:
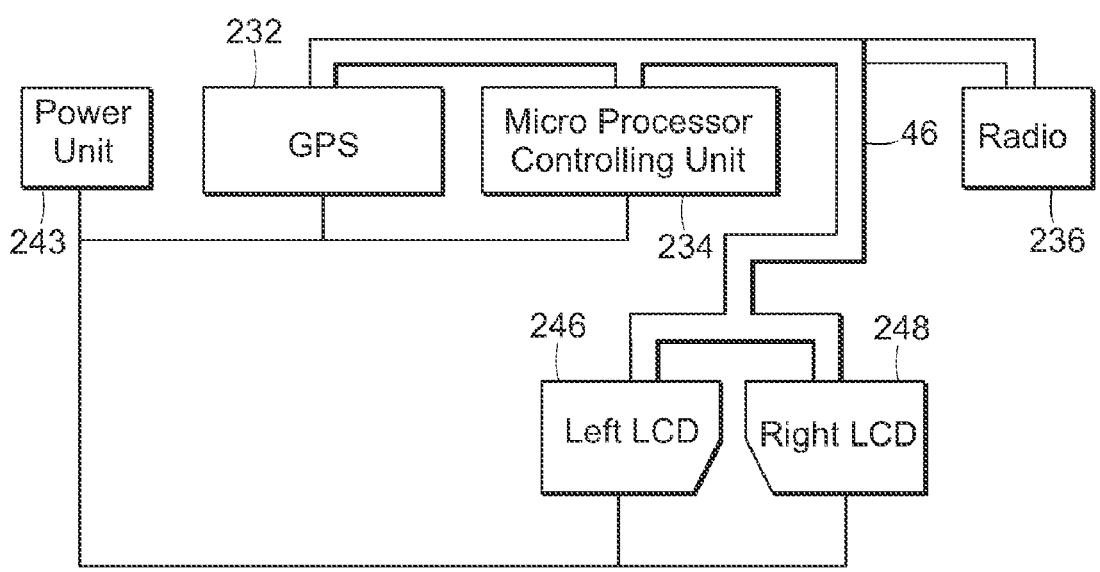
FIG. 7 is a block diagram of the functionality of the glasses of FIG. 4.

FIGS. 3 and 4-7 each depict an alternative portable device carried by the users. For example, the portable device 120 of FIG. 3 includes a GPS/antenna 134, communications antenna and radio 136, a display 122, and a directional pad 124. Similarly, the portable device 220 of FIG. 4 is in the configuration of glasses or goggles and includes a GPS and patch antenna 232, microprocessor 234, radio 236. Controls, such as the directional pad 224, are on the side frames (opposite side shown in FIG. 6). Batteries are stored in compartment 242. The displays are transparent LCD's as at 244 and, in particular, are LCD's left 246 and right 248 illustrated in FIG. 7. Examples of such a device are the MyVue headset made by MicroOptical Corp. of Westwood, Mass. (see, U.S. Pat. No. 6,879,443). In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

As used herein, GPS is meant to include all of the current and future positioning systems that include satellites, such as the U.S. Navistar, GLONASS, Galileo, EGNOS, WAAS, MSAS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Of course, the positional degree of accuracy is driven by the requirements of the application. In the NASCAR embodiment of the preferred embodiment, two meter accuracy provided by WAAS would probably be acceptable.

Figure 8:
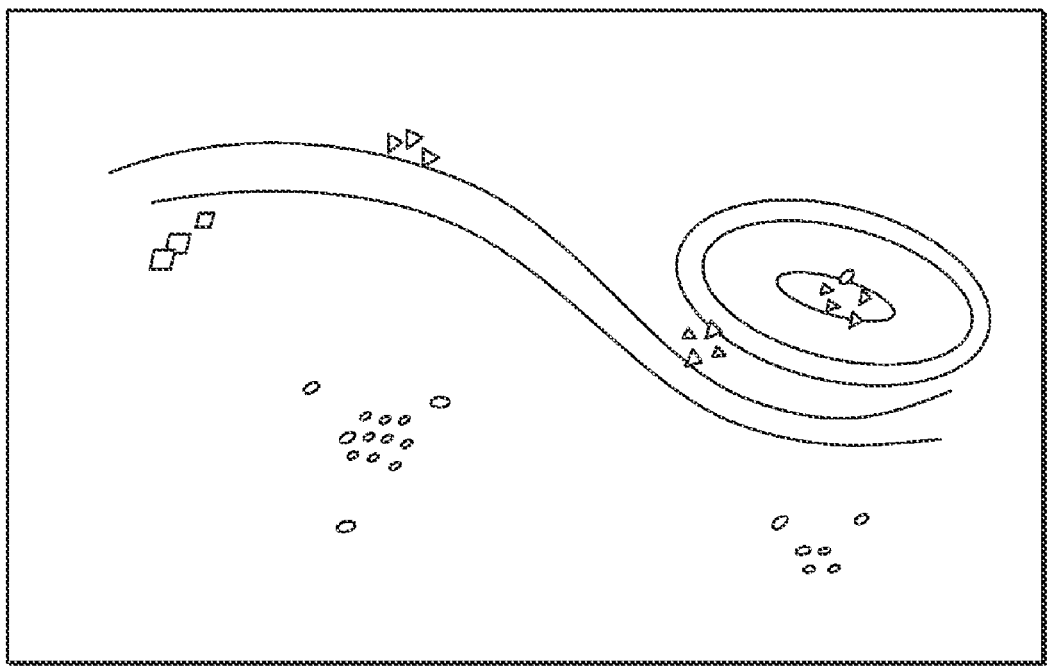
FIG. 8 is a diagram of a screen short from the portable device showing an overhead view of all participants in a region of interest.
Figure 9:
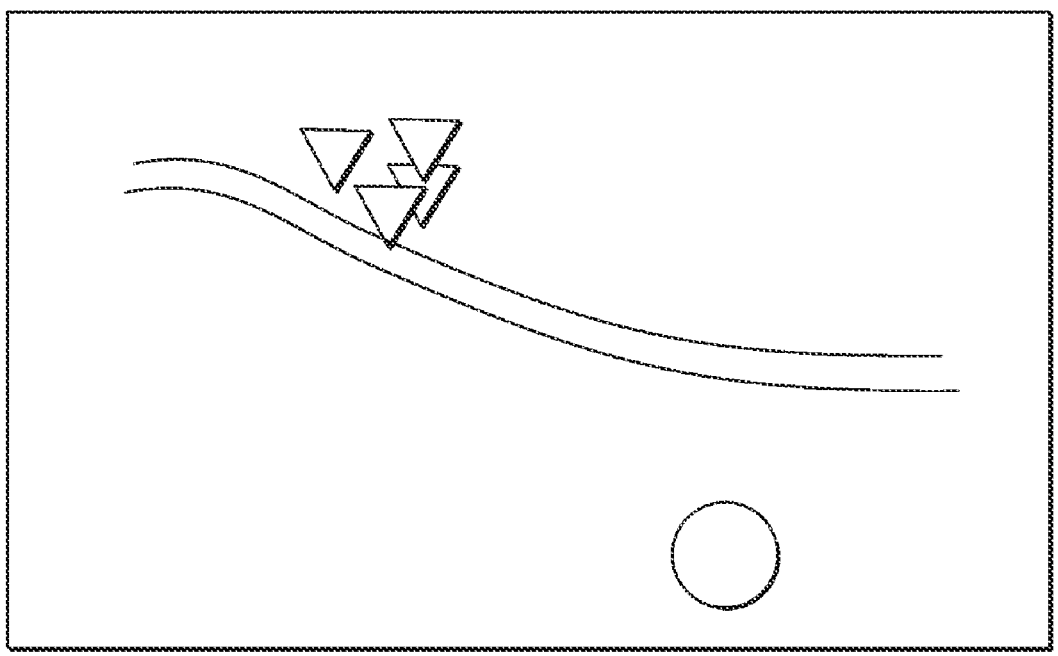
FIG. 9 is a diagram of a screen shot from the portable device showing an enlarged, overhead view of a particular set of participants from FIG. 8.
Figure 10:
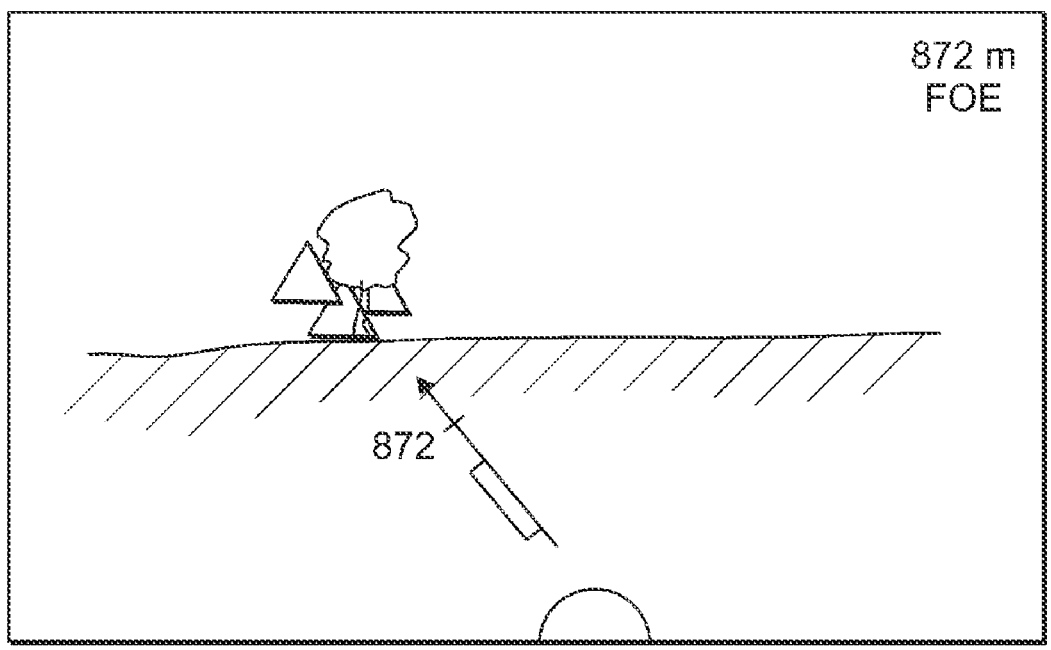
FIG. 10 is a diagram of a screen shot from the portable device showing the participants of FIG. 9, but from a lateral view and depicting information on the threats.

Discussing FIGS. 8-10 in conjunction, FIG. 8 depicts friendlies 10/11, unknowns 61, and foes 62 operating in an area of interest 12. In FIG. 9, a particular friendly 11 is at the base of a ridge and FIG. 10 is a rendering from the perspective of friendly 11. In FIG. 9, the friendly 11 has tilted upwardly his view so that he has an oblique angle view of foes 62 of FIG. 8. FIG. 8 is of a view of the same area 12 at the same moment in time as FIGS. 9-10, but the view is "zoomed" outwardly changing the scale and allowing to see more of the participants in area 12. FIG. 10 shows an augmented reality view where even if foes 62 cannot be seen visually (e.g., night, weather, distance), their location is depicted. Range, ID, and weapons cuing information is also depicted in FIG. 10. While the display of area 12 in FIGS. 8-10 is in real time, the user could alternatively obtain from the server a "Simul-Cam" using technology such as available from Dartfish where each unknown or foe is superimposed at a certain time into a time progression over a previous position to show movement.

Grahpics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline is advancing dramatically, mainly driven by gaming applications.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:
    OpenGL and the OpenGL Shading Language
    OpenGL ES 3D API for embedded devices
    Direct3D (a subset of DirectX)
    RenderMan
    RenderWare
    Glide API
    TruDimension LC Glasses and 3D monitor API There are also higher-level 3D scene-graph APIs which provide additional functionality on top of the lower-level rendering API. Such libraries under active development include:
    QSDK
    Quesa
    Java 3D
    JSR 184 (M3G)
    NVidia Scene Graph
    OpenSceneGraph
    OpenSG
    OGRE
    Irrlicht
    Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20.

While full 3D rendering is not possible with the device 20 described herein, advances in processing and rendering capability will enable greater use of 3D graphics in the future. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from security agents 48 or friendlies 10/11 can be made to the server 44, such as for images of a particular scene or audio of a particular friendly 10/11, weapon status, support requests, etc. This function is shown as at 50, 52 in FIG. 1.

While the preferred embodiment has been described in the context of a user in physical attendance, the use of the portable devices 20 at remote locations is equally feasible. For example, the portable device 20 can be used at a base station while watching an event on TV (e.g., RPV video), with the participant location and other information streaming over a secure link.

What is claimed:

1. A system for observing a security event comprising:
a plurality of friendly participants and other participants, each friendly participant having a GPS receiver for determining a friendly participant position and a radio for transmitting said friendly participant position;
a base station having a radio for receiving said friendly participant positions and transmitting said friendly participant and other participant positions; and
a plurality of handheld devices accompanying one or more friendly participants, each handheld device including a radio for receiving friendly and other participant positions and a graphics display selectable by said one or more friendly participant to display different views of the security event with a depiction of a participant position.

2. The system of claim 1, wherein at least one of the friendly participant views selectable on the display is the view from the friendly participant's position.

3. The system of claim 1, wherein a friendly participant view includes a friendly and other participant's positions rendered on the graphics display.

4. The system of claim 3, wherein said one or more handheld devices includes a processor for receiving said friendly and other participant positions and for comparing said friendly and other participant positions with said friendly participant's position, and is coupled to said graphics display to generate said friendly participant view from the friendly participant's position of said friendly and other participant positions.

5. The system of claim 4, wherein said friendly participant view from the friendly participant's position is adjustable by the friendly participant to zoom in or out.

6. The system of claim 1, wherein one of said friendly participant's different views is an overhead view of the security venue.

7. The system of claim 1, wherein one of said friendly participant's different views is an enlarged zoom view.

8. The system of claim 1, wherein one of said friendly participant's different views is a horizontally shifted pan view.

9. The system of claim 1, wherein one of said friendly participant's different views is a vertically shifted tilt view.

10. A method for observing a security event comprising:
   determining a position of one or more participants, including friendly and other participants, at an area of interest;
   transmitting the determined position of said one or more participants;
   equipping one or more friendly participants with a device having a graphics display;
   receiving the one or more participant positions on the friendly participant's devices; and
   viewing on the graphics display of the device a depiction of the one or more participant positions at said area of interest, whereby a friendly participant can selectively change the points of view on said device.

11. The method of claim 10, wherein said device includes a GPS receiver for determining a friendly participant's location, one of the selectable points of view being the area of interest from the friendly participant's position.

12. The method of claim 10, wherein one of said points of view being an overhead view of said area of interest with a rendering depicting positions of friendly and other participants.

13. The method of claim 10, wherein said participant position determining step comprises equipping a plurality of friendly participants with a GPS receiver.

14. The method of claim 10, wherein said participant positions are transmitted to a server, wherein said friendly participant's device authenticates with said server, and wherein said server communicates said participant positions to authenticated devices.

15. The method of claim 14, wherein said authenticated devices are remote from said venue, and said participant positions are communicated over a network.

16. A method of viewing a security event by a friendly participant comprising:
   determining the position of a friendly participant using a GPS receiver;
   wirelessly receiving the positions of a number of participants, including friendly and unknown participants, at said security event;
   rendering a graphical depiction of a plurality of participant positions at said security event;
   viewing the graphical depiction from said friendly participant position; and
   selectively changing the view point of said graphical depiction from said friendly participant position to another position.

17. The method of claim 16, wherein changing the view point of said graphical depiction comprises enlarging the depiction to a zoom view.

18. The method of claim 16, wherein changing the view point of said graphical depiction comprises rotating the depiction in a vertical axis to a tilt view.

19. The method of claim 16, including transmitting other information from friendly participants to other friendly participants.

20. The method of claim 16, wherein changing the view point of said graphical depiction comprises changing the view point to the location of another participant.

21. The system of claim 1, wherein one of said handheld devices operates as said base station.

* * * * *